United States Patent [19]

Muehlberger

[11] Patent Number: 5,637,242

[45] Date of Patent: Jun. 10, 1997

[54] HIGH VELOCITY, HIGH PRESSURE PLASMA GUN

[75] Inventor: Erich Muehlberger, San Clemente, Calif.

[73] Assignee: Electro-Plasma, Inc., Irvine, Calif.

[21] Appl. No.: 285,973

[22] Filed: Aug. 4, 1994

[51] Int. Cl.$^6$ ............................................. B23K 10/00
[52] U.S. Cl. ........................ 219/121.51; 219/121.5; 219/75; 219/121.47
[58] Field of Search ................ 219/121.46, 121.5, 219/121.51, 121.52, 74, 75, 121.59, 121.47, 76.16

[56] References Cited

U.S. PATENT DOCUMENTS

| | | | |
|---|---|---|---|
| 3,242,305 | 3/1966 | Kane et al. | 219/75 |
| 3,554,715 | 1/1971 | Bruning et al. | 219/121.51 |
| 3,914,573 | 10/1975 | Muehlberger | 219/76 |
| 4,133,987 | 1/1979 | Lakomsky et al. | 219/121.52 |
| 4,328,257 | 5/1982 | Muehlberger et al. | |
| 4,559,439 | 12/1985 | Camacho | 219/121.48 |
| 4,689,468 | 8/1987 | Muehberger | 219/121.47 |
| 4,788,408 | 11/1988 | Wlodarczyk et al. | 219/121.49 |
| 4,882,465 | 11/1989 | Smith et al. | 219/121.48 |

*Primary Examiner*—Mark H. Paschall
*Attorney, Agent, or Firm*—Loeb & Loeb LLP

[57] ABSTRACT

A high velocity, high pressure plasma gun operates in stable fashion and with a relatively constant arc input power using a highly combustible arc gas such as nitrogen. The gun includes an anode having an internal arc chamber and a nozzle extending through the anode from the arc chamber. The gun also includes a cathode disposed within the anode and having a generally cylindrical tip portion with a flat surface facing the arc chamber and formed by a tungsten insert in the tip portion. The arc chamber, which has a wall of varying slope along the length thereof, may comprise successive conical portions of different slope and shape, or it may comprise a bell-shaped configuration. The flat surface of the cathode tip portion and the varying wall slope of the arc chamber combine to prevent the arc produced by nitrogen or other highly combustible arc gases form burning or otherwise damaging the cathode tip and the arc chamber.

10 Claims, 7 Drawing Sheets

HIGH VELOCITY, HIGH PRESSURE PLASMA GUN

FIELD OF THE INVENTION

The present invention relates to plasma guns for spraying particulate matter onto a workpiece using a plasma stream produced by the gun, and more particularly to plasma guns for delivering particulate matter to a workpiece in high velocity, high pressure fashion.

HISTORY OF THE PRIOR ART

It is known in the art to provide a gun for delivering particulate matter such as metallic powder to a workpiece under conditions of high velocity and high pressure. The high velocity and high pressure cause the particulate matter to adhere to the workpiece in improved fashion, thereby improving the coating on the workpiece. Such guns typically employ a combustible gas or mixture of gases which, when ignited or detonated, produce the high velocity and high pressure transfer of the particulate matter to the workpiece.

One example of a combustion gun for delivering particulate matter to a workpiece under high velocity and high pressure is the so-called D-gun or detonation gun. In the detonation gun, an explosive gas mixture, typically acetylene and oxygen, plus powder in a carrier gas such as nitrogen, are sequentially injected into a barrel of the gun where they are ignited. The ignition takes place at a repetitive rate, which is typically 4–8 cps. High detonation pressures on the order of approximately 10 ATM and a supersonic flame within the barrel of the gun heat and accelerate the powder particles to speeds on the order of 2500 fps. While such guns produce improved coating of the particulate matter on the workpiece, they possess a number of disadvantages, not the least of which is the safety aspect.

An alternative form of combustion gun for delivering particulate matter to a workpiece under high velocity and high pressure is the so-called J-gun. J-guns typically utilize a safer liquid fuel, while at the same time operating at very high pressures and utilizing a thermally efficient powder aspiration injection. In a typical example, oxygen and a fuel such as kerosene are fed into a combustion chamber in the rear of the gun, where the mixture is ignited with a spark plug. The resulting combustion gases pass through the nozzle and barrel of the gun, producing a long and small-diameter flame. The flame delivers powder or other particulate matter to the workpiece at very high velocity and pressure. However, as in the case of the D-gun, the J-gun also poses certain safety problems and control problems.

The desire for a safer and more controllable technique for spraying particulate matter onto a workpiece under high velocity and pressure has led to consideration of plasma guns. In the typical plasma gun, a DC power supply is coupled between a cathode and a surrounding anode to create an arc within a chamber therebetween. Introduction of arc gas into the chamber produces a plasma stream or flame of relatively high velocity and temperature. The plasma stream exits a nozzle in the plasma gun and extends to the workpiece. This enables metallic powder and other particulate matter introduced into the plasma stream within the gun to be delivered to the workpiece at high velocity and in a molten state for formation of a desired coating on the workpiece.

While plasma guns are safer and easier to control than the detonation or combustion guns previously described, such guns also have their disadvantages. For one thing, the arc gas typically used in plasma guns can be relatively expensive, especially in view of the large quantities thereof often required to produce acceptable high velocity and pressure. Also, many of the arc gases typically used cannot be safely exhausted in large quantities without treatment thereof, further adding to the difficulties in using plasma guns for such applications.

In an effort to adapt plasma guns for use in high velocity and high pressure applications of the type in which detonation or combustion guns are typically used, resort has been had to using nitrogen or other highly combustible gases in such guns. Nitrogen is considerably less expensive than many of the other arc gases typically used, costing on the order of one-half as much or less. In addition, nitrogen can be safely exhausted into the atmosphere without the extensive treatment required of certain gases which are potentially harmful. However, nitrogen has been found to break down in a manner different from most other arc gases when introduced into the arc chamber in the face of the electrical potential difference provided by the DC power supply. The breakdown of the nitrogen is unstable, and tends to produce a highly concentrated arc which burns the surface of the cathode tip and the walls of the arc chamber leading to the nozzle. For this reason, plasma guns using highly combustible arc gases such as nitrogen for high velocity and high pressure applications have had limited success.

It would therefore be desirable to provide a plasma gun capable of operating in a satisfactory manner in high velocity and high pressure applications, particularly when highly combustible arc gases such as nitrogen are used. Such a gun should be capable of stable operation, and desirably should be capable of a relatively constant arc input power.

BRIEF SUMMARY OF THE INVENTION

Briefly stated, the present invention provides a plasma gun capable of stably operating in high velocity and high pressure fashion, particularly while using highly combustible gases such as nitrogen. In addition, such guns are capable of providing relatively constant arc input power.

In accordance with the features of plasma guns according to the invention, such guns preferably have a cathode tip of blunt rather than pointed configuration so as to be of generally cylindrical configuration and with a relatively flat bottom surface facing the arc chamber. The bottom surface may be defined by the shape of an insert of tungsten or other appropriate composition. Because of the shape and the composition of the cathode tip, the tendency of the cathode tip to burn in the face of nitrogen introduced into the arc chamber is greatly reduced.

In addition, and in accordance with a further feature of plasma guns according to the invention, the arc chamber leading from the cathode tip to the nozzle is also shaped so as to minimize burning of the walls thereof when nitrogen gas forms an arc therein. Instead of the more usual single-cone configuration, the arc chamber wall of plasma guns according to the invention has a slope which varies along the length of the arc chamber. To accomplish this, the wall may be stepped through at least two regions of different slope. Such regions may be conical portions of different shape and slope, with the portion of steeper slope being disposed adjacent the cathode tip, and a second conical region of lesser slope extending from the first conical portion into the nozzle. Alternatively, the wall may be of bell-shaped configuration. An arc chamber wall of non-constant slope has been found to distribute the arc throughout the arc chamber in a manner which minimizes burning of the chamber wall.

In an example of a high velocity, high pressure plasma gun in accordance with the invention, the anode has an internal chamber therein forming the arc chamber, and a nozzle extending through the anode from the arc chamber to the outside of the anode. The cathode is disposed within the anode and has the tip portion thereof extending into the arc chamber. The tip portion is of blunt, generally cylindrical configuration and presents a relatively flat surface to the arc chamber. Means are providing for introducing the nitrogen or other arc gas into the arc chamber between the tip portion of the cathode and the anode. Means are also provided for introducing spray material into the nozzle. The tip portion of the cathode is provided with the tungsten insert previously described, and the arc chamber walls of varying slope define first and second partial conical configurations of different shape and slope, as previously described. The means for introducing spray material into the nozzle comprises a pair of apertures extending radially into the nozzle from opposite portions of the anode.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
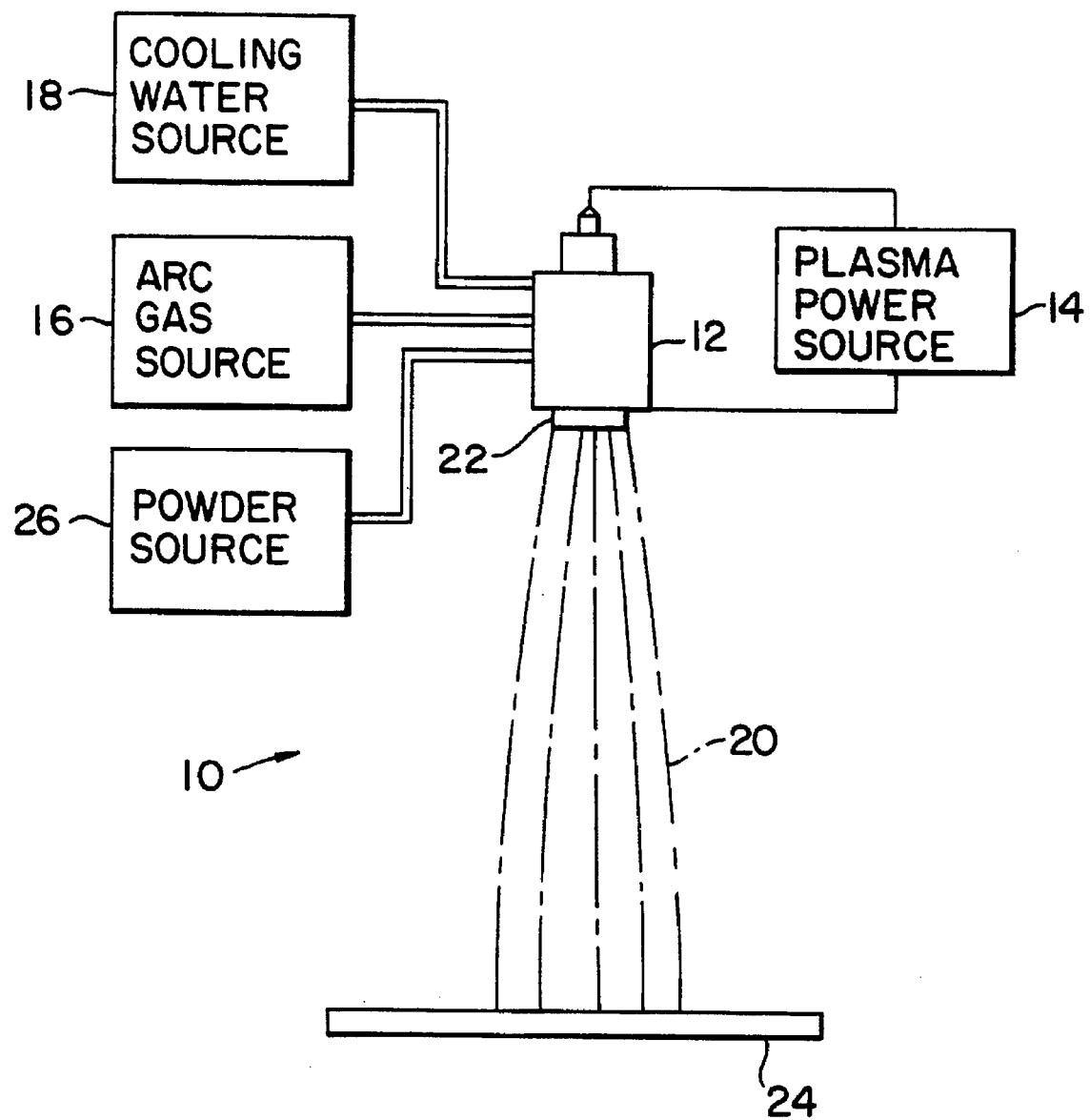
FIG. 1 is a plan view of a plasma system utilizing a high velocity, high pressure plasma gun in accordance with the invention.

FIG. 1 shows a plasma system 10 having a plasma gun 12 in accordance with the invention. The plasma gun 12 is coupled to a plasma power source 14 which may comprise a DC power supply coupled to the anode and the cathode of the plasma gun 12. An arc gas source 16 is coupled to provide arc gas to the plasma gun 12. The arc gas may comprise inert gas such as helium or argon. It may also comprise hydrogen. In accordance with the invention, however, and as described hereafter, the arc gas is preferably comprised of a relatively highly combustible gas such as nitrogen which the plasma gun 12 in accordance with the invention is capable of handling. Nitrogen is relatively inexpensive, and can be safely exhausted to the atmosphere. A cooling water source 18 which is coupled to the plasma gun 12 circulates cooling water to the plasma gun 12 to provide necessary cooling.

As described in greater detail hereafter, the plasma gun 12 operates in response to the plasma power source 14 and the arc gas from the gas source 16 to produce a high velocity, high pressure plasma flame or stream 20 from a nozzle 22 at the lower end thereof. The high velocity, high pressure plasma stream 20 is directed onto a workpiece 24. A powder source 26 introduces metallic powder or other particulate matter into the plasma gun 12 where the powder is entrained into the plasma stream 20. The powder particles are melted and carried by the plasma stream 20 to the workpiece 24 where they form coating on the workpiece 24. The high velocity, high pressure nature of the plasma stream 20 produces a dense and uniform coating of the powder material on the workpiece 24.

Apart from the plasma gun 12 which is described in detail hereafter, the rest of the plasma system 10 of FIG. 1 is essentially of conventional configuration. Reference is made to U.S. Pat. No. 4,328,257 of Muehlberger et al., commonly assigned with the present application, to the extent that detailed examples of one or more portions of the plasma system 10 of FIG. 1 are needed.

The plasma system 10 of FIG. 1 is shown as operating in atmosphere in a spray booth-type environment. However, where desired, the plasma system 10 can be operated as a low pressure system of the type described in U.S. Pat. No. 4,328,257. In that event, the system 10 is enclosed in a chamber coupled to a vacuum source or other low pressure source for producing the desired low pressure operating environment within the chamber.

Figure 2:
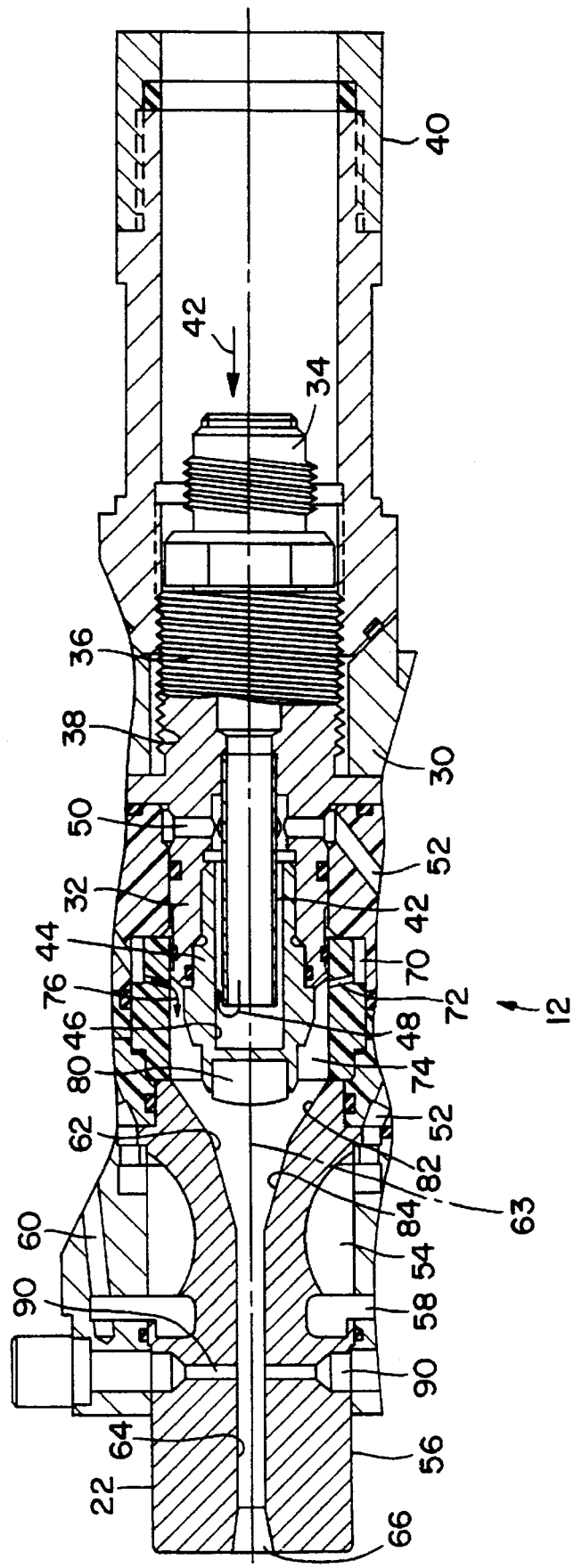
FIG. 2 is a cross-sectional view of a portion of the plasma gun of the system of FIG. 1.

FIG. 2 is a cross-sectional view of a portion of the plasma gun 12 of FIG. 1. As shown in FIG. 2, the plasma gun 12 includes an anode assembly 30 which is of rounded, hollow configuration and which receives a cathode assembly 32 therein. Although not shown in FIG. 2, the anode assembly 30 is coupled to the positive terminal of the plasma power source 14 of FIG. 1, and the cathode assembly 32 is coupled to the negative terminal of the plasma power source 14.

The cathode assembly 32 includes a hollow, cylindrical upstream portion 34 having a threaded exterior 36 for receipt within a threaded interior wall 38 of the anode assembly 30 to mount the cathode assembly 32 therein. Cooling water from the source 18 shown in FIG. 1 is introduced into a hollow, cylindrical upstream portion 40 of the anode assembly 30, through which it flows into the hollow interior of the upstream portion 34 of the cathode assembly 32, as shown by an arrow 42. From the interior of the upstream portion 34, the cooling water flows into the interior of a hollow tube 42 disposed within a tip assembly 44 at a downstream end of the cathode assembly 32. From the hollow interior of the tube 42, the cooling water flows out an open end thereof and onto the exterior of the tube 42 within a hollow chamber 46 in the tip assembly 44, as shown by an arrow 48. The cooling water exits the tip assembly 44 through an annular cavity 50 in the cathode assembly 32.

Figure 4:
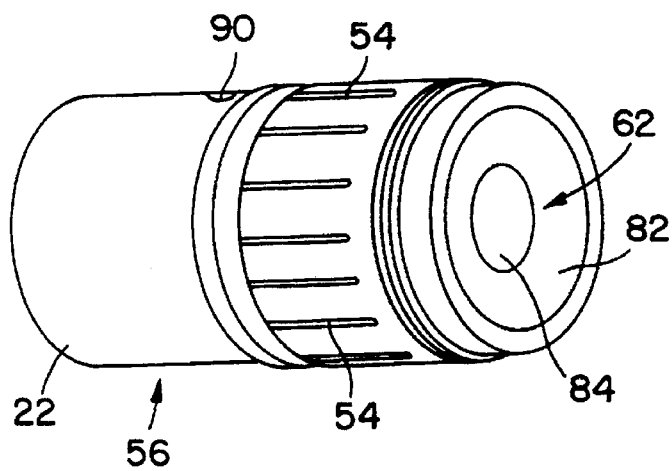
FIG. 4 is a perspective view of the nozzle assembly of the plasma gun of FIG. 2, having an arc chamber therein comprised of two stepped sections of different slope.

From the annular cavity 50, the cooling water flows through a passage 52 (only partially shown in FIG. 2) in the anode assembly 30 to a plurality of slot-like cavities 54 formed in an outer wall of a nozzle assembly 56 as described hereafter in connection with FIG. 4. From the cavities 54, the cooling water exits via an annular cavity 58 and a connecting passage 60 in the anode assembly 30.

In this manner, cooling water from the source 18 shown in FIG. 1 cools the cathode assembly 32, including particularly the tip assembly 44 thereof, and the anode assembly 30, including the nozzle assembly 56.

The nozzle assembly 56 is mounted within the hollow interior of the anode assembly 30 at a downstream portion of the anode assembly 30 adjacent the tip assembly 44 of the cathode assembly 32. The nozzle assembly 56 forms the nozzle 22 protruding from the lower end of the plasma gun 12 as shown in FIG. 1. The nozzle assembly 50 has a cavity at an upper end thereof which surrounds and forms an arc chamber 62 at the tip assembly 44. The arc chamber 62, which has a central axis 63, converges into a nozzle passage 64 which extends through the interior of the nozzle assembly 50 to a lower open end 66.

The arc gas source 16 shown in FIG. 1 is coupled to a ring-shaped cavity 70 within a portion of the anode assembly 30 surrounding the tip assembly 44. Arc gas introduced into the ring-shaped cavity 70 flows through a plurality of passages 72 to an annular cavity 74 which joins the arc chamber 62. The flow of arc gas through the passages 72 and into the annular chamber 74 is illustrated by an arrow 76 in FIG. 2. From the annular cavity 74, the arc gas flows into the arc chamber 62.

With the anode assembly 30 and the cathode assembly 32 coupled to the positive and negative terminals of the plasma power source 14, respectively, the flow of arc gas through the annular cavity 74 and into the arc chamber 62 causes a plasma arc to form within the arc chamber 62. This results in the plasma flame or stream 20 (shown in FIG. 1) which exits the nozzle 22 of the plasma gun 12 and flows to the workpiece 24. In typical prior art plasma guns, the converging arc chamber 62 is of conical configuration so as to have a constant slope over its entire length. While this works well with most arc gases, certain highly combustible gases such as nitrogen create problems in arc chambers of such design. In particular, the plasma arc is difficult to start, and when it does finally start becomes unstable so as to burn and thereby damage various surfaces within the arc chamber 62.

In accordance with the invention, the tip assembly 44 and the arc chamber 62 are specially configured to allow for the use of highly combustible gases such as nitrogen. The tip assembly 44 terminates in a relatively flat, blunt-shaped tungsten tip 80. At the same time, the arc chamber 62 is configured so that it does not have a constant slope relative to the central axis 63 thereof over the length thereof. This has been found to provide for a much more stable and non-damaging arc, particularly in the presence of highly combustible gases such as nitrogen. In addition to the resulting stability, the arc voltage and the arc current both remain relatively constant, producing a relatively constant arc input power.

In the example of FIG. 2, the arc chamber 62 is of non-constant slope relative to the central axis 63 thereof over the length thereof by virtue of being comprised of two different regions 82 and 84 of different slope. The first such region 82 extends into the nozzle assembly 56 from the tip assembly 44 with a first slope. The second region 84 extends further into the nozzle assembly 56 from the first region 82, but with a slope less than that of the first region 82. Both regions 82 and 84 are of cylindrical configuration but have different slopes and thereby different shapes. However, as described hereafter in connection with FIG. 6, the arc chamber 62 can assume other shapes or configurations having a non-constant slope along the length thereof, in accordance with the invention.

As previously described in connection with FIG. 1, a powder source 26 is coupled to provide powder particles or other particulate matter for entrainment into the plasma stream 20 formed by the plasma gun 12. Referring to FIG. 2, the powder from the source 26 is introduced into the plasma gun 12 through opposite passages 90 in the nozzle assembly 56. The passages 90 extend to the nozzle passage 64, and define the powder injection point for the plasma gun 12. The location of such powder injection point can be varied along the length of the nozzle assembly 56, as desired, in order to optimize the powder injection for a given set of plasma operating conditions.

Figure 3:
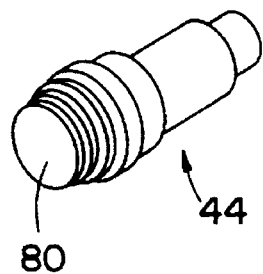
FIG. 3 is a perspective view of the tip assembly of the cathode of the plasma gun of FIG. 2.

FIG. 3 shows the tip assembly 44 of the cathode assembly 32. As shown in FIG. 3, the tip assembly 44 is of rounded configuration so as to seat within the hollow interior of the surrounding portion of the anode assembly 30. The tungsten tip 80 provides the tip assembly 44 with a relatively flat, blunt tip or nose. This feature has been found to provide considerable stability to arcs formed from highly combustible gases such as nitrogen.

FIG. 4 shows the nozzle assembly 56 in greater detail. As shown therein, the upstream end of the nozzle assembly 56 has the converging arc chamber 62 formed therein by the conical regions 82 and 84 of differing slope. The surrounding outer portion of the nozzle assembly 56 is provided with the cavities 54 therein through which the cooling water flows to cool the nozzle assembly 56. FIG. 4 shows one of the passages 90 through which powder is introduced into the nozzle passage 64 at the inside of the nozzle assembly 56. The opposite passage 90 is hidden from view in FIG. 4.

Figure 5:
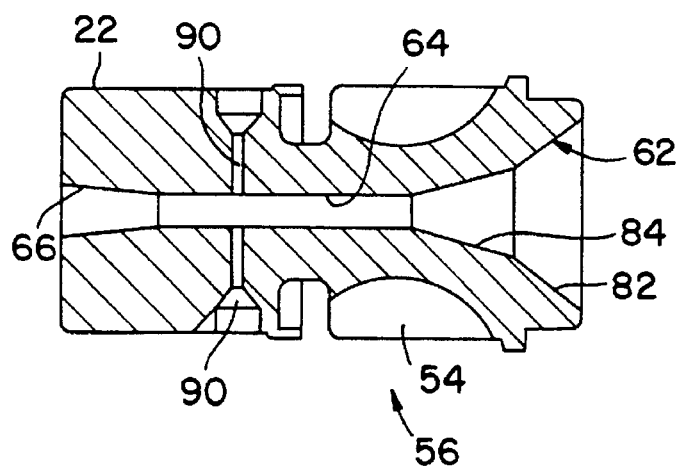
FIG. 5 is a side sectional view of the nozzle assembly shown in FIG. 4.

FIG. 5 is a side sectional view of the nozzle assembly 56 of FIG. 4. FIG. 5 once again shows the non-uniform slope of the arc chamber 62 in accordance with the invention. The two different conical regions 82 and 84 of different shape and slope provide the arc chamber 62 with non-constant slope along the length thereof. As previously noted, this feature in accordance with the invention greatly enhances the stability of the plasma arc formed within the arc chamber 62 by highly combustible plasma gases such as nitrogen. However, it is possible to achieve an arc chamber of non-constant slope in accordance with the invention, using other configurations. An alternative configuration is shown in FIG. 6.

Figure 6:
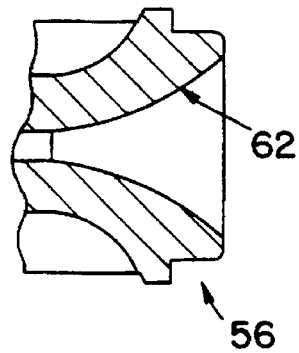
FIG. 6 is a side sectional view of an alternative embodiment of the nozzle assembly of FIGS. 4 and 5 in which the arc chamber is bell-shaped.

FIG. 6 is a side sectional view of a portion of the nozzle assembly 56 in which the arc chamber 62 is generally bell-shaped in configuration. Consequently, the walls of the arc chamber 62 have a constantly varying slope as they extend into the nozzle assembly 56 to form the converging arc chamber 62. Unlike the arrangements of FIGS. 2, 4 and 5 in which the arc chamber 62 is formed by the two different regions 82 and 84, the arc chamber 62 of FIG. 6 is formed by a single, bell-shaped region.

FIGS. 2 and 4–6 provide two different examples of arc chambers of non-constant slope, in accordance with the invention. However, it will be recognized by those skilled in the art that still other configurations are possible which provide the arc chamber with a non-constant slope along the length thereof.

Figure 7:
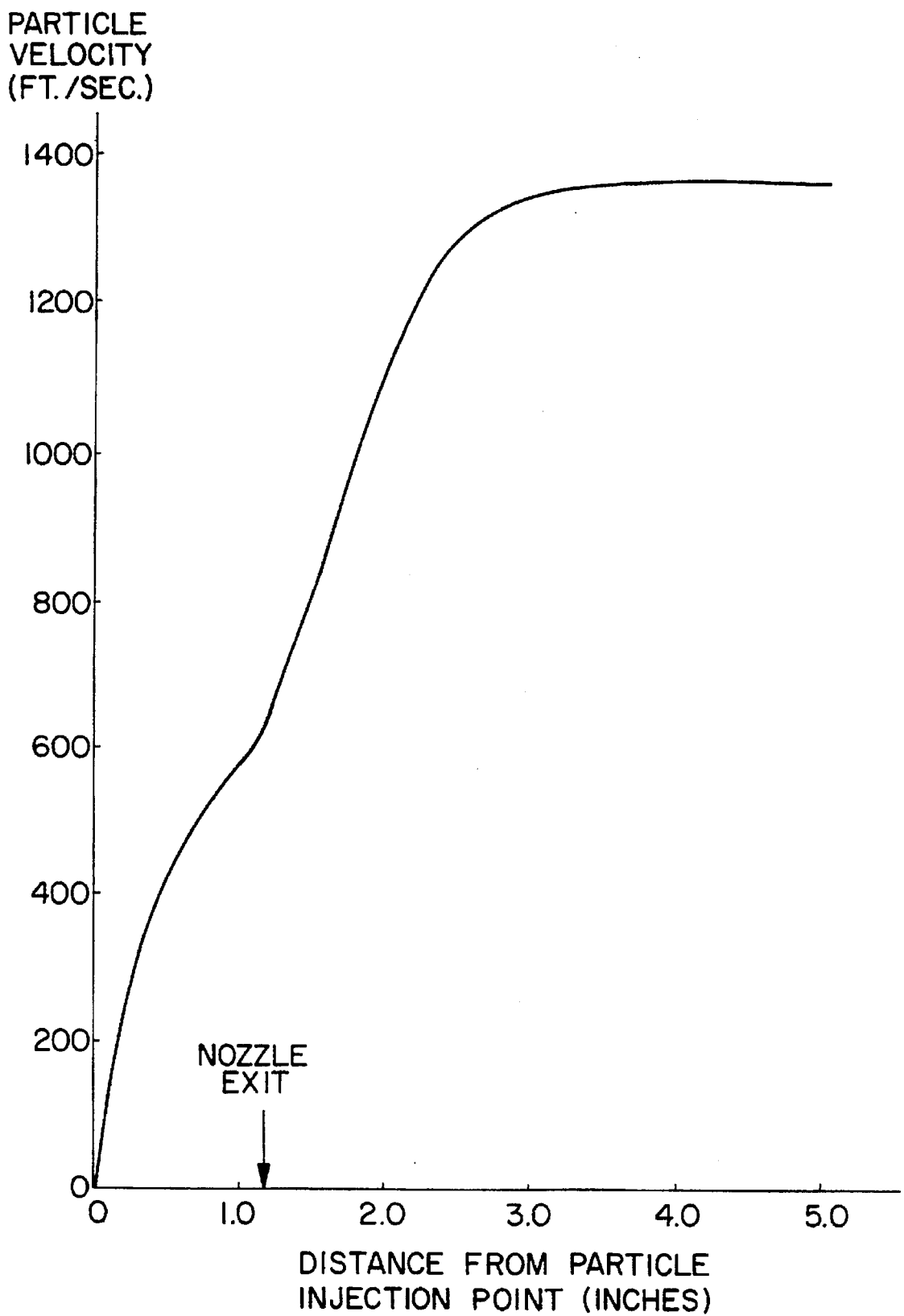
FIG. 7 is a diagrammatic plot of particle velocity as a function of distance from the particle injection point in the nozzle of FIGS. 4 and 5, for tungsten carbide cobalt particles in a given set of operating conditions of the plasma system of FIG. 1.

The manner in which the plasma gun 12 provides high velocity and high pressure using a highly combustible arc gas such as nitrogen is illustrated by the diagrammatic plots of FIGS. 7–10. FIG. 7 is a plot of particle velocity of powder particles supplied by the source 26 as a function of distance from the particle injection point within the plasma gun 12. The injection point is defined by the passages 90, and corresponds to the 0 point along the horizontal axis of FIG. 7. The nozzle exit, representing the terminus of the lower open end 66 of the nozzle 22, is shown in FIG. 7. Distances to the right of the nozzle exit in FIG. 7 represent positions outside of the nozzle 22. In the example of FIG. 7, the arc gas is nitrogen, the powder particles are of tungsten carbide cobalt composition (17% cobalt), the $\dot{w}$ is 0.017305 lb./sec., the stagnation enthalpy is 2904.71 BTU/lb. and the particle size is approximately 20 µm.

It will be seen in FIG. 7 that as the particle travels from the injection point to the nozzle exit (approximately 1.2 inches from the injection point), the particle velocity increases from 0 ft./sec. to approximately 600 ft./sec. At that point, the particle exits the nozzle 22 of the plasma gun 12 and continues to accelerate. Eventually, particle velocity levels off at a peak value of slightly less than 1400 ft./sec., which begins at a distance of just over 3.0 inches from the injection point. As the distance of the particle from the injection point continues to increase to 5.0 inches and beyond, the particle velocity remains at just under 1400 ft./sec. This is a very high velocity, particularly for a plasma gun operating at atmospheric pressure (1 ATM).

Figure 8:
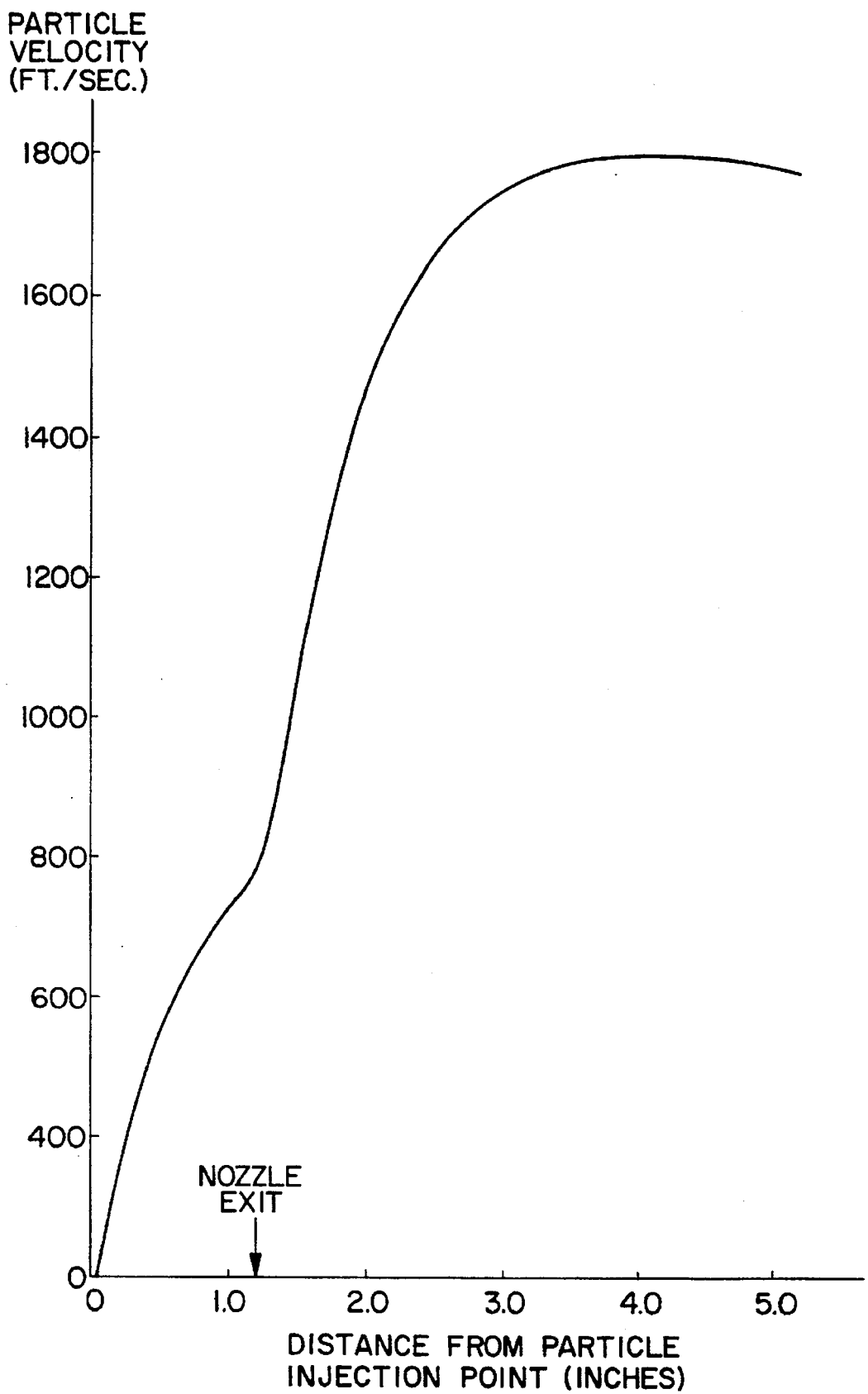
FIG. 8 is a diagrammatic plot like that of FIG. 7 and for the given set of operating conditions of the plasma system of FIG. 1, but using stainless steel particles.

In the example of FIG. 8, the operating conditions and materials are the same as those of FIG. 7, except that the powder particles are of stainless steel instead of tungsten carbide cobalt. It will be seen in the example of FIG. 8 that the particles accelerate from 0 ft./sec. to approximately 800 ft./sec. as they move from the injection point to the nozzle exit. As the particles move beyond the nozzle exit, they accelerate to a peak velocity of approximately 1800 ft./sec. As in the example of FIG. 7, this represents extremely high particle velocity, particularly for a plasma gun operating at a static pressure of 1 ATM.

Figure 9:
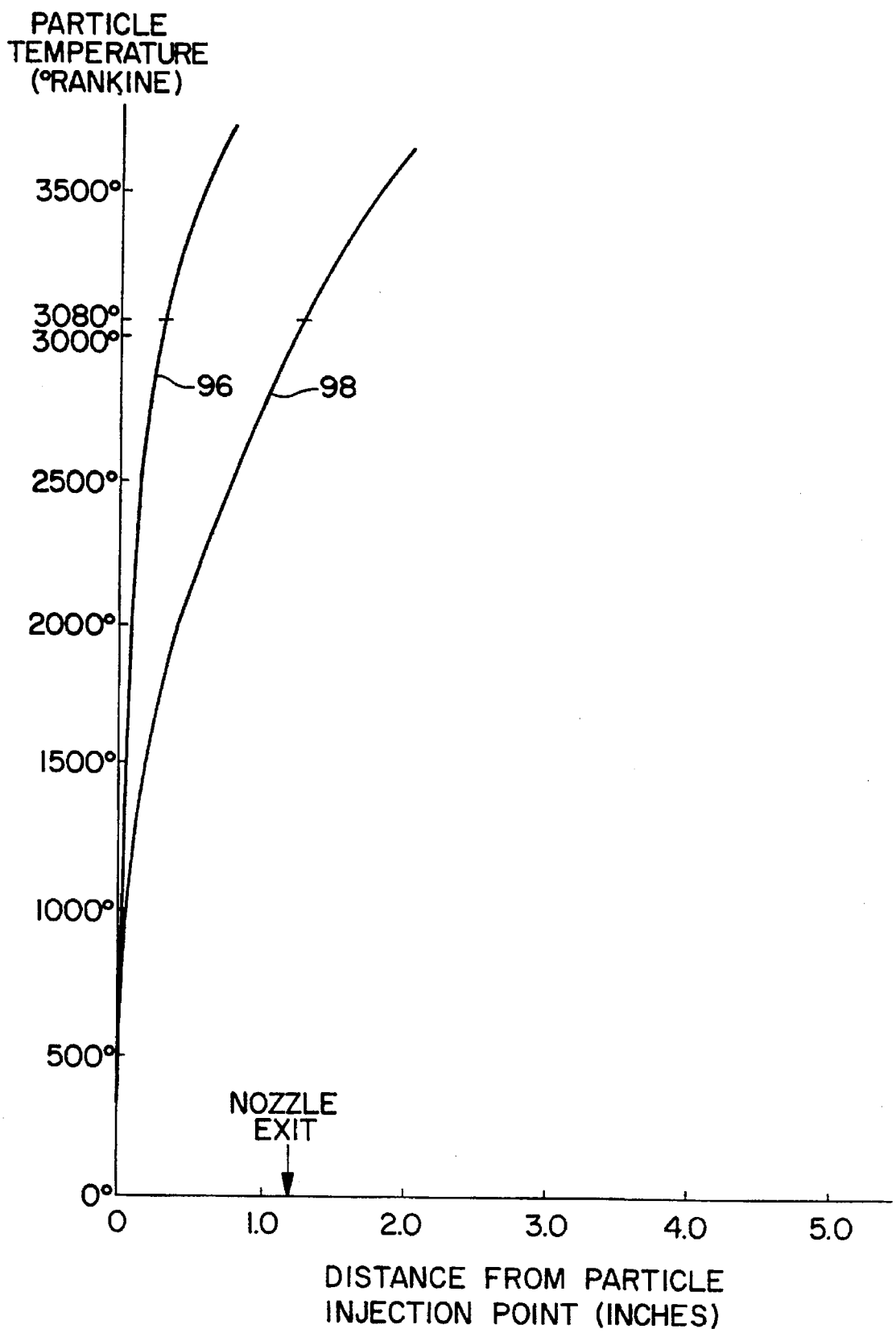
FIG. 9 is a diagrammatic plot of particle temperature as a function of distance from the particle injection point in the nozzle of FIGS. 4 and 5, for stainless steel particles in the given set of operating conditions of the plasma system of FIG. 1.

FIG. 9 is a plot of particle temperature as a function of distance from the injection point, for stainless steel particles of two different sizes. A first line 96 is the plot for stainless steel particles of approximately 20 µm size, while a line 98 is the plot for stainless steel particles of approximately 50 µm size. As in the case of FIGS. 7 and 8, the arc gas is nitrogen, the $\dot{w}$ is 0.017305 lb./sec. and the stagnation enthalpy is 2904.71 BTU/lb. The melting point of the stainless steel particles is approximately 3060° Rankine.

As shown in FIG. 9, the 20 µm particles, represented by the curve 96, increase in temperature to the melting point of 3060° as the particles move from the injection point to a distance of approximately 0.2 inches therefrom, which is still within the nozzle 22. The 50 µm stainless steel particles heat somewhat more slowly, and do not reach the melting temperature of 3060° until they reach a distance from the injection point which is just slightly outside of the nozzle exit. As shown by the curves 96 and 98 of FIG. 9, the temperatures of the particles continue to increase substantially beyond the melting temperature of 3060° as the particles continue to move through and then out of the nozzle 22 of the plasma gun 12.

Thus, FIG. 9 illustrates that even for particles of stainless steel or other composition which are relatively difficult to melt, plasma guns in accordance with the invention are capable of quickly heating such particles to their melting point and well beyond as such particles move from the injection point to the exit of the gun nozzle and beyond.

Figure 10:
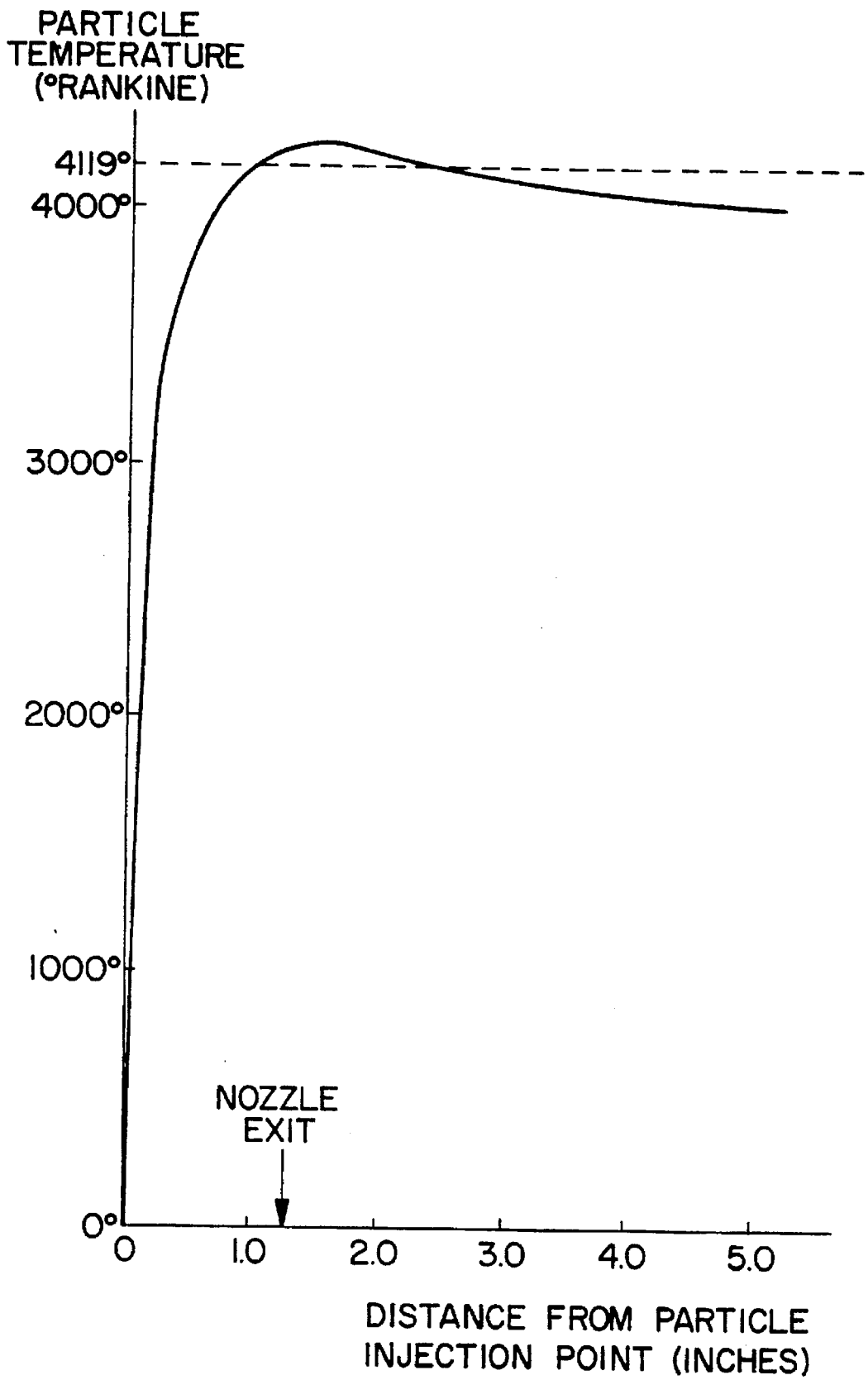
FIG. 10 is a diagrammatic plot like that of FIG. 9 and for the given set of operating conditions of the plasma system of FIG. 1, but using alumina particles.

FIG. 10 is a plot of particle temperature as a function of distance from the particle injection point for conditions and materials like those of FIG. 9, except that the particles are alumina particles of approximately 20 µm size. The alumina particles have a melting point of 4119° Rankine. As will be seen from FIG. 10, as the particles advance from the injection point toward the nozzle exit, the temperature thereof quickly rises to a level just above the melting temperature of 4119°. The temperature remains above the melting point briefly before decreasing to a value slightly below the melting point, as the distance increases beyond about 2.0 inches.

FIG. 10 illustrates that even alumina particles which are extremely difficult to heat to the melting point and beyond are indeed so heated by plasma guns in accordance with the invention. The manner in which plasma guns according to the invention are capable of operating in high velocity, high pressure fashion using highly combustible arc gases such as nitrogen, is further illustrated by the following three examples.

EXAMPLE 1

In this case, a plasma gun like that shown in FIG. 2 was operated using nitrogen as the arc gas. The arc conditions were such that the power in was 73.6 KW, the power into the water was 20.58 KW, the power into the arc gas was 53.02 KW, the voltage was 368 volts, the current was 200 amps, the thermal efficiency was 72% and the gas flow was 0.0164 lb./sec. or 815.4 SCFH (standard cubic feet per hour). The gas conditions within the arc were such that the stagnation pressure was 9.299 ATM, the stagnation temperature was 9540° R (5300° K.) and the stagnation enthalpy was 3065 BTU/lb. The stagnation pressure of 9.299 ATM is very high and on the order of that achieved in combustion guns. The exit conditions were such that the carrier flow of the powder was 45 SCFH, the total flow was 860.4 SCFH (or 0.0173 lb./sec.), the stagnation enthalpy was 2904.7 BTU/lb., the gas velocity was 7225.15 ft./sec., the mach number was 2.078, the stream temperature was 5972° R (3318° K.) and the static pressure was 1 ATM.

EXAMPLE 2

In this case, both the arc conditions and the gas conditions in the arc were the same as those of Example 1. However, the carrier flow at the exit was increased to 145 SCFH, such that the total flow increased to 960.4 SCFH (0.07241 lb./sec.). The stagnation enthalpy was 2603 BTU/lb. instead of 2904.7 BTU/lb. The gas velocity was 6604.45 ft./sec. instead of 7225.15 ft./sec., and the mach number was 1.7988 instead of 2.078. The stream temperature was 6272.86° R (3484.92° K.). As in Example 1, the static pressure was 1 ATM.

EXAMPLE 3

In this case, the arc conditions were such that the input power was decreased to 62.722 KW, the water power in was 17.56 KW and the gas power in was 45.16 KW. As in the case of Examples 1 and 2, the voltage was 368 volts. However, the current was decreased to 170.44 amps. The thermal efficiency was 72%, and the gas flow was increased to 0.0246 lbs./sec. (1223 SCFH). The gas conditions in the arc were such that the stagnation pressure increased to 11.8 ATM. The stagnation temperature was decreased to 5940° R (3300° K.), and the stagnation enthalpy decreased to 1740.44 BTU/lb. As in the case of Example 2, the exit conditions were such that the carrier flow was 145 SCFH. The total flow increased to 1368 SCFH (0.02752 lb./sec.). The stagnation enthalpy remained at 2904.7 BTU/lb. The gas velocity was reduced to 5856.13 ft./sec., and the mach number increased to 2.153. The stream temperature was reduced to 3229.6° R (1794.2° K.). Again, the static pressure was 1 ATM.

While various forms and modifications have been suggested, it will be appreciated that the invention is not limited thereto but encompasses all expedients and variations falling within the scope of the appended claims.

What is claimed is:

1. A high velocity, high pressure plasma gun comprising the combination of:

an anode having an internal arc chamber therein and a nozzle extending through the anode from the arc chamber and having a static pressure at the outside thereof;

a cathode disposed within and electrically insulated from the anode and having a cooling chamber therein and a tip portion extending into the arc chamber from the cooling chamber, the tip portion being of generally cylindrical configuration and presenting a relatively flat surface to the arc chamber, the tip portion being relatively thin between the relatively flat surface and the cooling chamber to provide substantial cooling of the relatively flat surface by the cooling chamber, the arc chamber having a central axis and a wall extending in converging fashion from the tip portion to the nozzle and having a slope therebetween which varies relative to the central axis;

means for introducing arc gas into the arc chamber between the tip portion of the cathode and the anode to provide an arc gas flow of at least four hundred SCFH, the means for introducing arc gas producing a stagnation pressure at a region of introduction of the arc gas which is at least three times greater than the static pressure;

the plasma gun producing a plasma stream which exits the nozzle at a speed of at least about Mach 1.7988; and means for introducing spray material into the nozzle.

2. A high velocity, high pressure plasma gun in accordance with claim 1, wherein the tip portion of the cathode includes a tungsten insert forming the entire relatively flat surface, the insert extending through most of the thickness of the tip portion between the relatively flat surface and the cooling chamber.

3. A high velocity, high pressure plasma gun in accordance with claim 1, wherein the arc gas comprises nitrogen.

4. A high velocity, high pressure plasma gun in accordance with claim 1, wherein the wall of the arc chamber has a first region thereof adjacent the tip portion in the shape of a partial cone of given wall slope relative to the central axis and a second region thereof between the first region and the nozzle in the shape of a partial cone of wall slope relative to the central axis which is less than the given wall slope of the first region.

5. A high velocity, high pressure plasma gun in accordance with claim 1, wherein the wall of varying slope of the arc chamber is generally bell-shaped.

6. A high velocity, high pressure plasma gun in accordance with claim 1, wherein the means for introducing spray material into the nozzle comprises a pair of apertures extending radially into the nozzle from opposite portions of the anode.

7. A high velocity, high pressure plasma gun in accordance with claim 1, wherein the anode has a generally cylindrical nozzle assembly mounted therein having a nozzle extending therein from one end thereof and coupled to a diverging opening at an opposite second end thereof, the diverging opening forming at least a portion of the arc chamber.

8. A high velocity, high pressure plasma gun in accordance with claim 1, wherein the arc gas comprises nitrogen and the wall of varying slope of the arc chamber shapes and extends an arc formed in the arc chamber by the nitrogen out of the arc chamber and into the nozzle to prevent burning the wall of the arc chamber.

9. A high velocity, high pressure plasma gun in accordance with claim 3, wherein the static pressure is 1 ATM, and the means for introducing nitrogen introduces the nitrogen into the arc chamber at a flow rate of at least about 815.4 SCFH and produces a stagnation pressure of at least about 9.299 ATM.

10. A high velocity, high pressure plasma gun in accordance with claim 1, wherein the means for introducing arc gas produces a stagnation pressure at a region of introduction of the arc gas which is 3–15 times greater than the static pressure.

* * * * *